Figure 1:
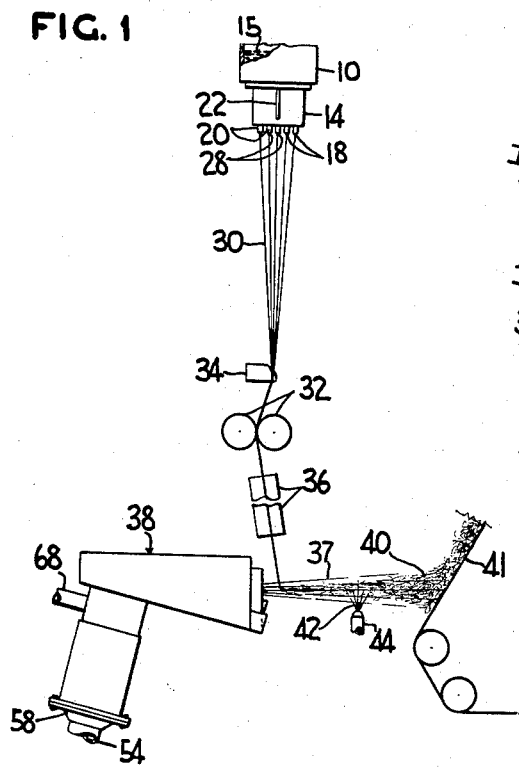

Feb. 12, 1963   C. H. HELBING ETAL   3,077,093
METHOD FOR FORMING GLASS FIBERS
Filed Dec. 3, 1959

INVENTORS
CLARENCE H. HELBING and
DONALD W. DENNISTON
BY
Oscar L Spencer
ATTORNEY 3,077,093
METHOD FOR FORMING GLASS FIBERS
Clarence H. Helbing, Shelbyville, Ind., and Donald W. Denniston, Ross Township, Pa., assignors to Pittsburgh Plate Glass Company, Allegheny County, Pa., a corporation of Pennsylvania
Filed Dec. 3, 1959, Ser. No. 857,097
7 Claims. (Cl. 65—7)

The present invention relates to a method for forming glass fibers and it has particular relation to a method for making long, curly glass fibers by contacting an elongated body of glass with a gaseous blast. The invention is also applicable to the formation of other heat softenable mineral fibers.

U.S. Patents Nos. 2,489,242 and 2,489,243 describe a method and apparatus for forming very fine, discontinuous glass fibers. In this method, a high velocity, high temperature, gaseous blast contacts a primary stream or solid rod of glass at an angle, preferably a right angle, and heats the stream or rod to a temperature sufficient to soften it and permit it to be attenuated by the velocity of the blast. The blast is formed in a combustion chamber burner by introducing a combustible mixture of gases at a relatively low flow rate and at a relatively low pressure, i.e., 2 to 10 pounds per square inch into the chamber, and completely burning the gases within the chamber. The burned gases issue through a restricted orifice at one end of the chamber as a high temperature (3000° F.), high velocity (500 to 700 feet per second) blast. The restriction of the gases as they pass through the orifice greatly accelerates them and provides the blast with the high velocity. Usually the ratio of the cross-sectional area of the chamber to the cross-sectional area of the orifice is between 4:1 and 8:1. This method of forming fibers is designed for economical production of very fine fibers, i.e., about 5 microns or less, but it is not employed for the production of much larger diameter fibers, i.e., 10 to 30 microns in diameter, such as are used in disposable air filters.

In a commercial process utilizing the combustion chamber burners described above to make fibers, the primary rods are drawn from a plurality of bushings located in a line across the forming area. The rods are introduced side by side in a line across the forming area into a series of gaseous blasts produced by a series of burners mounted in side-by-side relation in a line across the forming area. The secondary fibers formed from the primary rods are collected on a foraminous conveyor in the form of a porous, fluffy blanket.

To attain maximum production in this process, it is essential that the rods be placed as close as possible for entry into the blast. If the primary rods are too close, the secondary fibers produced from them become entangled and cannot be attenuated to the proper degree. In this case, the secondary fibers sometimes weld together to form large, brittle clumps of glass in the blanket or mat being formed.

The permissible dimensions of the blast are somewhat limited to attain maximum production. If the height (or depth) of the blast is too great, the primary rods tend to waver in the blast before being softened and attenuated and to weld to each other. The only way to prevent the primary rods from wavering and welding together is to space the rods relatively far apart. This is undesirable for it decreases the amount of production which can be obtained from a given width of gaseous blast. Thus, the depth or height of the blast should be about 2 to 4 inches.

The formation of a given size secondary fiber is dependent upon the dimensions, temperature and velocity of the blast. If too great a velocity is present, too fine a secondary fiber is produced. It is desired to use a natural gas-air mixture to produce the blast because of its relatively low cost. When a stoichiometric mixture is burned to produce a blast of 2 to 4 inches in depth or height, the temperature is too great to produce the large diameter secondary fibers, i.e., 10 to 30 microns in diameter. When the mixture of gases is made lean enough (less natural gas than required for a stoichiometric mixture) to provide a blast of lower temperature and a velocity suitable for making the desired size secondary fibers, the mixture of gases does not support uniform, continuous, efficient combustion.

It is an object of this invention to provide a method suitable for the economical manufacture of relatively large diameter fibers in blanket or layer form, preferably long, curly, large diameter fibers suitable for use in blanket form as an air filter medium.

These and other objects of the invention are accomplished by burning a combustible mixture of gases, i.e., natural gas and air in substantially stoichiometric amounts, in a first zone or chamber, moving the burned gases into a second zone or chamber, mixing with the burned gases in the second zone a gas such as air at a lower temperature than the temperature of the burned gases and discharging the mixture of gases into a row of primary rods to soften and attenuate them into large diameter, long, curly secondary fibers. In discharging the mixture of gases, the gases may be made to change their direction in the second or a third zone or chamber to provide flow characteristics to the gases which are especially suitable for making curly fibers.

Figure 2:
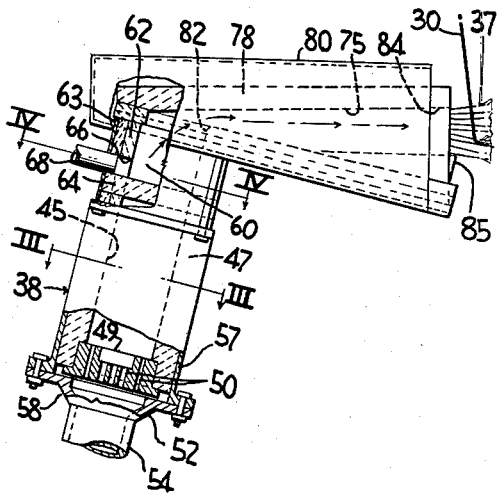
Figure 3:
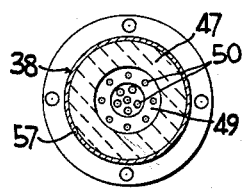
Figure 5:
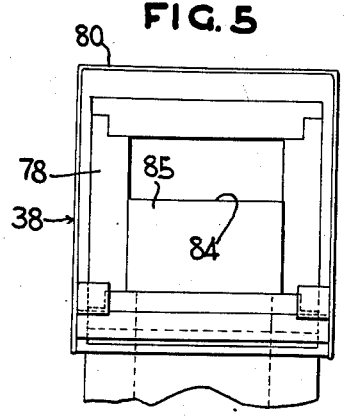
Figure 4:
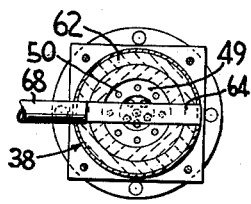

The means and manner of accomplishing these and other objects of the invention are further described in conjunction with the drawing in which:

FIG. 1 is an elevation of a fiber forming process;
FIG. 2 is a view partially in section illustrating a burner for use in the practice of the invention;
FIG. 3 is a section taken along line III—III of FIG. 2;
FIG. 4 is a section taken along line IV—IV of FIG. 2; and
FIG. 5 is a side view of the burner shown in FIG. 2.

In FIG. 1 a portion of a forehearth 10 of a continuous glass melting furnace is shown. The forehearth 10 is formed of refractory blocks, and it has a platinum alloy, trough-like bushing 14 mounted at the bottom of a well in the forehearth. The alloy may consist of 90 percent by weight platinum and 10 percent by weight rhodium. Molten glass 15 flows from the melting furnace into the forehearth and through orifices 18 of bushing 14. The orifices are located in the form of rows in the bottom portion of the bushing. The orifices are defined by hollow, cylindrical tips 20 which are integral with and extend a slight distance below the level of the bottom portion of the bushing.

Terminals 22 are welded to the end walls of the bushing at opposite ends of the bushing 14. These terminals are connected to a source of current (not shown). The glass while in the bushing and passing through the orifices in the bushing is heated by conduction of heat from the electrically heated bushing. The temperature and viscosity of the glass as it flows through the bushing is controlled by the amount of electric current which passes through the bushing. The glass forms a cone 28 at the bottom of each tip 20 with the apex of the cone 28 facing downward. The glass which forms the primary rod 30 is drawn off the apex of the cone by suitable means such as rollers 32 which grip the rod after it has solidified. The degree of necking down or attenuation of the glass in the cone 28 is controlled by the speed at which the solid rod 30 is pulled away from the cone and the temperature of the glass in the cone and slightly below the cone. The diameter of the solid rod can be about 250 to 650 microns. The invention is described in detail with regard to the use of solid rods of glass, but it is to be understood that the invention is applicable to the use of molten streams of glass as the form of the glass to be attenuated.

The solid primary rods 30 are aligned in a metal guide 34 in side-by-side relation in a straight row prior to their passage between the rollers 32. The guide 34 may be in the form of a comb. The rods 30 pass from the rollers 32 into grooves on about one tenth inch centers in another metal guide 36. The guide 36 introduces the rods in this spacing at about an angle of about 50 to 150°, preferably 75 to 90°, into a gaseous blast 37 formed by a burner 38. The heat in the blast 37 softens the glass rods 30 and the velocity and turbulence of the blast draws them out into long, curly secondary fibers 40. The secondary fibers 40 are gathered in the form of a fluffy, porous blanket on a foraminous conveyor 41 according to conventional fiber collecting practices.

The guide 36 may be heated so as to preheat the solid rods 30 prior to their entry into the blast 37 or the rods may be otherwise preheated by suitable means prior to their entry into the blast to aid in reheating them to attenuating temperature. A thermosetting, resinous binder 42 is usually applied by spray means 44 to the secondary fibers 40 as they pass through the air and prior to their being collected on the conveyor 41. The blanket is then compacted to uniform thickness and heated to cure the binder so as to bind the secondary fibers to each other.

The burner 38 produces an improved gaseous blast for the attenuation of the primary rods 30 into long, curly secondary fibers 40 having diameters of 10 to 30 microns. The burner 38 is shown in greater detail in FIGS. 2 to 5. The burner 38 is composed of a first zone or chamber 45 having walls 47 formed of a ceramic, refractory material or other material capable of receiving heat and transferring heat to a combustible mixture of gases within the chamber. The wall is of sufficient thickness, for example, 1 to 4 inches, so as to provide insulation for the chamber 45. The chamber 45 is substantially circular in cross section, however, it is understood that it may be oval, rectangular or of other cross section as desired.

The chamber 45 is closed at one end by a ceramic, refractory grid plate 49 containing a series of small orifices 50 in the general outline of a circle. These orifices 50 connect chamber 45 with inlet manifold 52 and supply a combustible mixture of gases such as natural gas and air to the chamber 45 from the inlet manifold 52. The grid plate serves to stabilize combustion of the gases in the chamber 45.

The gases are supplied in substantially stoichiometric relation for maximum efficiency of burning. The natural gas-air mixture is supplied to inlet manifold 52 by a suitable conduit 54 connected to suitable means (not shown) for mixing and compressing the combustible mixture. The refractory chamber 45 is provided with a supporting metal shell 57. This metal shell is bolted to the metal housing 58 enclosing the inlet manifold 52 which brings the combustible mixture of gases into the burner.

The gases are substantially completely burned in chamber 45 and then move into a second zone or chamber 60 which may be formed merely by the extension of the walls 47 of chamber 45 or may be formed separately by ceramic, refractory walls 62 about 1 to 4 inches in thickness. The refractory walls 62 are enclosed by a metal shell 63. In flowing from the chamber 45 to the chamber 60 the gases must flow around a ceramic, refractory, shadow wall 64 which is mounted across the chamber 60 at the entrance of the chamber. Located just downstream of the shadow wall 64 in chamber 60 is an entrance port 66 provided with a conduit 68 which may be in the form of a metal pipe. The conduit 68 extends partially into port 66 and may extend into the chamber 60 behind the shadow wall 64. If the conduit 68 extends into the chamber 60 it can be provided with numerous openings in its wall to supply a cooling fluid to the chamber 60. The pipe 68 is connected to a source of a cooling fluid such as air, steam, or water which is at a considerably lower temperature, i.e., from room temperature up to about 250° F., than the gases burned in chamber 45. The invention will be described hereinafter with respect to air as the cooling fluid. Suitable means such as a pump (not shown) is provided in line 68 to force the low temperature gas into chamber 60.

The purpose of the shadow wall 64 is to prevent the overheating of the conduit 68. The shadow wall 64 also serves to create some turbulence in the burned gases flowing from chamber 45 to chamber 60 and thus permit better mixing of the air from conduit 68 with the burned gases. The air is introduced right behind the shadow wall and eddy currents which are formed by the burned gases from chamber 45 passing around the shadow wall help to mix the air entering from conduit 68 with the burned gases. The shadow wall 64 may be in the form of a single bar or strip passing across the width of the chamber 60 or it may be in the form of a plurality of bars. The shadow wall 64 should be of sufficient dimensions to form a visual shield to prevent radiation from the interior of chamber 45 onto the conduit 68 extending into chamber 60.

In the chamber or second zone 60 of the burner 38 the air from conduit 68 is mixed with the burned gases from chamber 45 so as to reduce the temperature of the gases. The reduction of the temperature of the gases would normally reduce their volume and thus reduce the velocity with which they flow through the remainder of chamber 60. The addition of the air from conduit 68 offsets this loss in volume and velocity and may even increase the volume and velocity so that the gases in chamber 60 are not reduced in velocity to the same extent that they would be if their temperature was merely reduced. The temperature of the burned gases from chamber 45 may be reduced in chamber 60 approximately 700 to 1300° F. from about 3000° F. to produce a mixture of gases in chamber 60 at a temperature of about 1700 to 2300° F. depending upon the size of secondary fiber that is to be produced.

The gases of chamber 60 next pass into a third zone or chamber 75 whose center line, as shown in FIGS. 1 and 2, is at a substantial angle, for example, 60 to 90°, with the center line of the chamber 60. The chamber 75 must be long enough to permit shaping of the flow gases from chamber 60 so as to form a long, narrow blast having a height of about 2 to 4 inches for issuance from the burner 38 against primary rods 30. The chamber 75 is substantially rectangular in cross section and is formed of a ceramic, refractory material 78 which may be of sufficient thickness to be capable of receiving heat and serving as an insulating wall for the chamber 75. The refractory material 78 is held together by a metal enclosure 80.

Chamber 75 is connected with chamber 60 in such a manner that the cross-sectional area of chamber 75 decreases to a minimum at the point of connection with chamber 60. This causes the gases from chamber 60 to have a path of travel of greatly decreased cross-sectional area in going from the chamber 60 to the main portion of chamber 75. After passing through this narrow passageway 82 at the jointure of chambers 60 and 75, the gases expand slightly and assume their flow characteristics for discharge from the long, narrow opening 84 at the end of the chamber 75. A triangular shaped ceramic, refractory wedge 85 positioned at the end of the chamber helps to shape the gases for discharge from the burner. Different size wedges can be employed to produce different size openings 84 and different flow characteristics in the blast issuing from opening 84. The sectional view of FIG. 2 illustrates the narrowing of the passageway 82 for the gases through the chambers 60 and 75 of the burner 38.

The blast 37 issues from the opening 84 in the form of a long, narrow blast having a depth of about 2 to 4 inches and having a width of about 4 to 12 or more inches. The average velocity of the blast 37 is about 100 to 400 feet per second, for example, 200 feet per second, and the average temperature of the blast is about 1700 to 2300° F., for example, 2000° F. The blast impinges on the primary rods 30 to soften them and attenuate them into long, curly fibers having a diameter of about 10 to 30 microns or greater.

The cross section of the blast as shown in FIGS. 1 and 2 with the rods entering the blast from the top shows that the primary rods 30 pass substantially completely through the depth of the blast before they are sufficiently heated to soften them and permit bending and pulling out of the rod into the secondary fibers 40. The burning off or bending position of the rods 30 in the blast 37 is controlled in operation by the size of the primary rod 30 and the speed at which they are projected into the blast by the rollers 32. In a typical operation, rods 30 of a diameter of about 250 to 650 microns are introduced into the blast at a speed of about 0.1 to 1 foot per second. This enables the bending and burning off of the rods 30 to be achieved near the bottom of the blast 37.

As described above, the primary rods 30 are introduced into guide 34 between rollers 32 and thereafter into grooves in metal guide 36. This is done by hand by the operator reaching up to bushing 14 and starting the formation of rods 30 by pulling glass from cones 28, next passing the rods through the guide 34 and rollers 32 and then threading them in the grooves in the guide 36. In doing this, he must reach over the burner 38. Thus, the burner 38 must not be too long or it prevents easy access to the bushing 14 and the primary rod guides. By having the first and second zones or chambers 45 and 60 aligned with their center lines being substantially vertical and having the gases pass vertically through these chambers before moving substantially horizontally through chamber 75, the length of the burner 38 as far as a horizontal dimension is concerned is greatly shortened and the operator has easy access to the primary rods for starting the fiber forming operation. Where length of the burner is not a critical factor, the chambers 45, 60 and 75 may be in line.

The bending of the gases as they pass from chamber 60 to chamber 75 also appears to change their flow characteristics upon issuance from chamber 75 (for example, to increase the scale and intensity of turbulence of the gases) so as to permit the production of curlier fibers than normally produced by a burner wherein the gas flow is generally in a continuous straightforward direction through the burner. This may be due to the centrifugal action which is present as the burned gases turn the corner between chambers 60 and 75 and which sets up a flow pattern in the gases as they are discharged from chamber 75 which is more conducive to the formation of curly fibers. This flow pattern appears to be such that the gases have a higher velocity at the top of the blast 37 than at the bottom as it issues from the opening 84 of the burner 38.

The present invention provides for the use of a combustion chamber burner of modified form to substantially completely burn a stoichiometric mixture of natural gas and air and form the burned gases into a blast suitable for making long, curly, relatively large diameter fibers. This is done by means of a blast having a temperature below the burning temperature of the combustible mixture of gases and a velocity suitable for forming large diameter fibers. This permits efficient use of the fuels employed to form the blast and enables the production of a blast having new properties which produce fibers of a sort not heretofore economically producible from a gaseous blast formed by the combustion of natural gas and air. The invention also provides a process and means for producing curly fibers suitable for use as a light, porous disposable air filter medium.

Although the present invention has been described with respect to specific details of certain embodiments thereof, it is not intended that such details be limitations upon the scope of the invention except insofar as set forth in the accompanying claims.

We claim:

1. A method of forming glass fibers which comprises supplying an elongated body of glass in a form in which it can be attenuated into fibers by engagement with a gaseous blast, burning a combustible mixture to produce burned gases in a first zone, moving the burned gases to a second zone, reducing the temperature of the burned gases in the second zone, changing the direction of flow of the burned gases and discharging the gases to engage the elongated body of glass so as to attenuate it into fibers.

2. A method of forming glass fibers which comprises supplying an elongated body of glass in a form in which it can be attenuated into fibers by engagement with a gaseous blast, burning a combustible mixture to produce burned gases in a first zone, moving the burned gases to a second zone, combining the burned gases in the second zone with a cooling fluid at a lower temperature to reduce the temperature of the burned gases, changing the direction of flow of the gases in the second zone and discharging the gases to engage the elongated body of glass so as to attenuate it into fibers.

3. A method of forming glass fibers which comprises supplying an elongated body of glass in a form in which it can be attenuated into fibers by engagement with a gaseous blast, burning a combustible mixture to produce burned gases in a first zone, moving the burned gases to a second zone, combining the burned gases in the second zone with a cooling fluid at a lower temperature to reduce the temperature of the burned gases, moving the gases from the second zone into a third zone so as to change the direction of flow of the gases as they pass from the second zone through the third zone and discharging the gases from the third zone to engage the elongated body of glass so as to attenuate it into fibers.

4. A method of forming glass fibers which comprises supplying an elongated body of glass in a form in which it can be attenuated into fibers by engagement with a gaseous blast, burning a combustible mixture to produce burned gases in a first zone, moving the burned gases to a second zone, combining the burned gases in the second zone with a cooling fluid at a lower temperature to reduce the temperature of the burned gases, moving the gases in the second zone into a third zone, restricting the flow path of the gases from the second zone to the third zone, enlarging the dimensions of the gaseous flow path in the third zone and discharging the gases from the third zone to engage the elongated body of glass so as to attenuate it into fibers.

5. A method of forming glass fibers which comprises supplying an elongated body of glass in a form in which it can be attenuated into fibers by engagement with a gaseous blast, burning a combustible mixture to produce burned gases in a first zone, moving the burned gases to a second zone, creating turbulence in the gases in the second zone, combining the burned gases in the second zone with a cooling fluid at a lower temperature to reduce the temperature of the burned gases and discharging the gases in the form of a blast to engage the elongated body of glass and attenuate it into fibers.

6. A method of forming glass fibers which comprises supplying an elongated body of glass in a form in which it can be attenuated into fibers by engagement with a gaseous blast, burning a combustible mixture to produce burned gases in a first zone, moving the burned gases to a second zone and around an obstruction in the second zone so as to create turbulence in the burned gases in the second zone, combining the burned gases in the second zone with a cooling fluid at a lower temperature to reduce the temperature of the burned gases and discharging the gases in the form of a blast to engage the elongated body of glass and attenuate it into fibers.

7. A method of forming glass fibers which comprises supplying an elongated body of glass in a form in which it can be attenuated into fibers by engagement with a gaseous blast, burning a combustible mixture to produce burned gases in a first zone, moving the burned gases to a second zone, creating turbulence in the gases in the second zone, combining the burned gases in the second zone with a cooling fluid at a lower temperature to reduce the temperature of the burned gases, moving the gases into a third zone whereby the direction of flow of the gases is changed and the gases are momentarily restricted in their cross-sectional flow path and discharging the gases to engage the elongated body of glass to attenuate it into fibers.

References Cited in the file of this patent

UNITED STATES PATENTS

| | | |
|---|---|---|
| 2,481,543 | Stalego | Sept. 13, 1949 |
| 2,489,243 | Stalego | Nov. 22, 1949 |
| 2,499,218 | Hess | Feb. 28, 1950 |
| 2,583,736 | Hess | Jan. 29, 1952 |
| 2,614,619 | Fuller | Oct. 21, 1952 |
| 2,645,814 | Stalego | July 21, 1953 |
| 2,681,696 | Stalego | June 22, 1954 |
| 2,699,631 | Stalego | Jan. 18, 1955 |
| 2,779,661 | Robell | Jan. 29, 1957 |
| 2,808,254 | O'Brien | Oct. 1, 1957 |
| 2,810,157 | Slayter | Oct. 22, 1957 |
| 2,925,620 | Karlovitz et al. | Feb. 23, 1960 |
| 2,978,744 | Schroeder | Apr. 11, 1961 |
| 2,980,952 | Stalego | Apr. 25, 1961 |